3,094,496
PROCESS OF MIXING DIENE RUBBERS WITH NITROSOARYLAMINOMETHYLIMIDES IN THE PRESENCE OF REINFORCING FILLERS

Lloyd A. Walker, St. Albans, W. Va., assignor to Monsanto Chemical Company, St. Louis, Mo., a corporation of Delaware
No Drawing. Filed Sept. 14, 1960, Ser. No. 55,848
7 Claims. (Cl. 260—5)

The present invention relates to a process of improving the properties of diene rubber compositions and more particularly to improving the properties of diene rubber mixes containing a relatively high proportion of reinforcing pigment.

The nitrosoarylaminomethylimides are known to be a relatively stable class of compounds reactive with butyl rubber. In the case of rubbers containing a major proportion of a diene hydrocarbon, they cause excessive cross-linking and seriously interfere with processing. However, it has now been found that if processing is carried out in the presence of reinforcing pigment, the reaction takes a different course. The compounds function as efficient catalysts for so called "low hysteresis" processing of carbon black-rubber mixes. The action of catalysts for low hysteresis processing has been explained on the basis of promoting reaction between rubber and carbon black. While the improved adjuvants provided by the present invention are presumed to function by similar mechanisms and are therefore described as promoters, this is not really known. The invention is not limited to any theory of the mechanisms by which the catalysts impart the desirable properties hereinafter described in detail. For convenience, the mechanism by which internal friction of the rubber is reduced as manifested by such measurements as heat buildup and torsional hysteresis will be assumed to be through promoting rubber-filler interaction.

The promoters may be regarded as derivatives of N-methyl C-nitroso aromatic amines in which nitrogen replaces hydrogen in the methyl group to provide a structure in which two nitrogen atoms are linked by a methylene group, one nitrogen being further linked to a nitroso substituted aromatic group and the second being part of an imide ring, the methylene group replacing imido-hydrogen. By an imide ring is meant a structure in which the nitrogen is part of two carboxylic or thiocarboxylic acid residues. The two acid residues are preferably connected through two carbon atoms which are part of an aromatic ring. Further substitution is permissible in either or both aromatic rings, particularly halogen, lower alkyl, lower alkoxy and nitro substitituents. Compounds typical of the class comprise N-(p-nitrosoanilinomethyl)-maleimide,
N-(3-methyl-4-nitrosoanilinomethyl)-phthalimide,
4-nitro-N-(p-nitrosoanilinomethyl)-phthalimide,
4-chloro-N-(p-nitrosoanilinomethyl)-phthalimide,
4-chloro-N-(3-chloro-4-nitrosoanilinomethyl)-phthalimide,
N-(p-nitrosoanilinomethyl)-thiophthalimide,
N-(p-nitrosoanilinomethyl)-dithiophthalimide,
N-(p-nitrosoanilinomethyl)-bicyclo[2.2.1]-hept-5-ene-2,3-dicarboximide,
N-(p-nitrosoanilinomethyl)-4,5-dimethyl-1,2,3,6-tetrahydrophthalimide,
N-(p-nitrosoanilinomethyl)-tetrachlorophthalimide,
3-(p-nitrosoanilinomethyl)-2,4-thiazolidine-dione,
bis-(p-nitrosoanilinomethyl)-pyromellitimide,
N-(p-nitrosoanilinomethyl)-phthalimide,
N-(3-chloro-4-nitrosoanilinomethyl)-phthalimide,
N-(3-bromo-4-nitrosoanilinomethyl)-phthalimide,
N-(N-methyl-p-nitrosoanilinomethyl)-phthalimide,
N-(N-ethyl-p-nitrosoanilinomethyl)-phthalimide,
N-(N-propyl-p-nitrosoanilinomethyl)-phthalimide,
N-(N-isopropyl-p-nitrosoanilinomethyl)-phthalimide,
N-(3-chloro-N,4-dinitrosoanilinomethyl)-phthalimide,
methyl-N-(p-nitrosophenyl)-N-(phthalimidomethyl)-beta-alanate,
N-(p-nitrosoanilinomethyl)-succinimide,
N-(m-chloro-p-nitrosoanilinomethyl)-1,2,3,6-tetrahydrophthalimide,
N-(p-nitrosoanilinomethyl)-1,2,3,6-tetrahydrophthalimide,
3-(p-nitrosoanilinomethyl)-5,5-dimethylhydantoin,
N-(p-nitrosophenyl)-N-(phthalimidomethyl)-beta-alanine and
N-(3-chloro-N-ethyl-4-nitrosoanilinomethyl)-phthalimide.

The nitrosoarylaminomethylimides used in the practice of this invention and as illustrated by the foregoing examples, are characterized by the structure

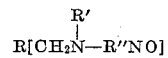

where R is an organic imido substituent in which nitrogen is linked to the methylene group in the brackets, R' is hydrogen, lower alkyl, nitroso, cyanoethyl, lower alkyl carboxyethyl or carboxyethyl and R'' is phenyl or phenyl substituted by halogen, lower alkyl, lower alkoxy or nitro radicals. The compounds may be used in the form of the free bases or in the form of salts or metal salt complexes. Salts and metal salt complexes possess properties similar to those of the free bases. The preparation of nitrosoaryliminomethylimides is described in U.S. Patent 2,927,930, granted March 8, 1960 to John J. D'Amico.

Improved vulcanizates are obtained according to the present invention by incorporating into the rubber and heating a relatively large proportion of reinforcing pigment together with a small amount of nitrosoarylaminomethylimide and masticating the mixture during or following the heat treatment. Amounts of 0.05–5% of the rubber hydrocarbon comprise the practical useful range under most conditions. These are not the absolute limits and measurable effects are obtained with smaller amounts. Similarly, larger amounts can be used but usually without advantage. The preferred range is 0.25–1%. Vulcanizing and other ingredients as desired are added preferably after heating and mixing rubber, reinforcing pigment and promoter. Delayed action accelerators of the thiazolesulfenamide type are preferably used but the invention is not limited to any particular vulcanizing system. The nitrosoarylaminomethylimides have essentially no accelerating action.

The heating should be at least 250° F. (121° C.) and preferably 300–370° F. (149–188° C.) with heating times ranging from 1 to 12 minutes in the dynamic treatment, i.e. where the compositions are heated and masticated at the same time. In static treatment longer heating times will be required to effect similar results and times may extend up to sixteen hours.

Any of the rubber reinforcing pigments may be used in the practice of the invention. These include reinforcing silica but reinforcing carbon blacks are preferred. The black may be either furnace black or channel black. The amount of black is desirably at least 25 parts by weight per 100 parts by weight of rubber and usually 40–50 parts by weight in the case of tread stocks. Carbon black is normally added first in the mixing cycle and in the usual practice of this invention promoter is added concomitantly with it. Banbury mixing is advantageous because it exerts severe masticating action and achieves uniform dispersion of the ingredients within short mixing times. The nitrosoarylaminomethylimides exert pronounced dispersing action on reinforcing pigments. If desired, the promoter may be premixed with reinforcing pigment and the mixture added to the rubber.

As illustrative of the invention the promoter was added along with carbon black to styrene-butadiene copolymer rubber in a Banbury mixer. Styrene-butadiene copolymer (SBR–1502) rubber, 1400 parts by weight, was charged to the Banbury mixer and mixed for 3 minutes at 25° C. The test material was then added to a portion, 400 parts by weight, of the rubber from the Banbury mixer. The addition was made on the differential rolls of a rubber mill at 50° C. The stock was milled for about 5 minutes and cut several times from side to side to obtain adequate dispersion. The milled portion containing the test material was then added to the remainder of the stock in the Banbury together with carbon black. The Banbury mixer was heated to 100° C. before making these additions. Banbury mixing was continued for a total of 6 minutes at 100° C. and the stocks then dumped and passed six times through a rubber mill at 50° C. Vulcanizable stocks were compounded on the mill at 50° C. by adding stearic acid, zinc oxide, saturated hydrocarbon softener, sulfur and N-cyclohexyl-2-benzothiazolesulfenamide. These were then compared to a similarly prepared stock without the chemical additive. The completed formulations were as follows:

| Stock | Parts by weight | |
|---|---|---|
| | A | B |
| Styrene-butadiene copolymer rubber | 100 | 100 |
| Chemical promoter | | 0.5 |
| Carbon black (high abrasion furnace) | 50 | 50 |
| Zinc oxide | 4 | 4 |
| Stearic acid | 2 | 2 |
| Saturated hyerocarbon softener | 10 | 10 |
| N-cyclohexyl-2-benzothiazolesulfenamide | 1.2 | 1.2 |
| Sulfur | 1.75 | 1.75 |

The stocks were cured in the usual manner by heating in a press 45 minutes at 144° C. The modulus of elasticity at 300% elongation a tthe optimum cures was determined in the usual manner. Torsional hysteresis was determined at room temperature with an apparatus which embodied a torsional pendulum. In this apparatus the sample of rubber tested supplied the force to restore the pendulum when it was deflected. This supplied a measure of the energy not returned on torsional deformation. The logarithmic decrement of the observed amplitude was recorded. Heat rise from the base temperature after flexing in a Goodrich flexometer at 100° C. was also determined. Typical results are recorded below:

| Chemical promoter | 300% modulus | Torsional hysteresis | Heat rise, ° C |
|---|---|---|---|
| None | 1930 | 0.218 | 39 |
| N-(p-Nitrosoanilinomethyl)-phthalimide | 2580 | 0.195 | 30 |
| N-(N-Methyl-p-nitrosoanilinomethyl)-phthalimide | 2470 | 0.197 | 30 |

Comparable results were obtained substituting N-cyclohexyl 2-benzothiazolesulfenamide by N-tert-butyl-2-benzothiazolesulfenamide or 2-(2,6-dimethyl-4-morpholinylmercapto)benzothiazole. It was further observed that reducing the accelerator level to 1.0 part and sulfur to 1.5 parts did not affect the relative improvements in properties. Significantly, the processing safety is not adversely affected by practice of this invention. The processing safety of stocks A and B was evaluated by means of a Mooney plastometer. The time required for incipient vulcanization or scorch was taken as the time required for the Mooney plasticity to rise then points above the minimum.

| Chemical promoter: | Mooney scorch in mins. at 135° C. |
|---|---|
| None | 24.7 |
| N-(p-Nitrosoanilinomethyl)-phthalimide | 27.3 |

As stated above, the promoters possess no significant accelerating activity. For example, employing N-(p-nitrosanilinomethyl)-phthalimide as the accelerator in stock A in the place of N-cyclohexyl-2-benzothiazolesulfenamide, a modulus of only 490 pounds per square inch was developed after heating in a press for 60 minutes at 144° C. However, the compounds exert a strong activating effect. Addition of 0.5 part N-(p-nitrosoanilinomethyl)-phthalimide to stock A on a mill at 50° C. resulted in a stock having a Mooney scorch time of only 7 minutes at 135° C. This illustrates the importance of effecting the reaction between the rubber-carbon black and promoter before the curing step.

By the method described above in connection with the stocks designated A and B, further demonstration of the invention was carried out employing a promoter concentration of 0.25 part. The completed formulations were as follows:

| Stock | Parts by weight | |
|---|---|---|
| | C | D |
| Styrene-butadiene copolymer rubber (SBR 1501) | 100 | 100 |
| Chemical promoter | | 0.25 |
| Carbon black (medium processing channel) | 35 | 35 |
| Carbon black (high abrasion furnace) | 15 | 15 |
| Zinc oxide | 4 | 4 |
| Stearic acid | 2 | 2 |
| Saturated hydrocarbon softener | 10 | 10 |
| N-cyclohexyl-2-benzothiazolesulfenamide | 1.2 | 1.2 |
| Sulfur | 1.75 | 1.75 |

The stocks were cured in the usual manner by heating in a press for 60 minutes at 144° C. The resulting properties are recorded below:

| Chemical promoter | 300% modulus | Torsional hysteresis | Heat rise, ° C. in Goodrich flexometer |
|---|---|---|---|
| None | 1520 | .237 | 33 |
| N-(p-Nitrosoanilinomethyl)-phthalimide | 1900 | .217 | 25 |

The Mooney viscosity of the unvulcanized stock prepared with the promoter was 106 as compared to 95 for the untreated control. On the other hand, when the procedure was varied by mixing the rubber with N-(p-nitrosoanilinomethyl)-phthalimide for 3¼ minutes in a Banbury at 100° C. before adding carbon black, the Mooney viscosity was greater than 200 as compared to 94 for the untreated control. All Mooney viscosity determinations were carried out at 100° C. This illustrates the crosslinking which takes place in the absence of reinforcing pigment.

As illustrative of use in natural rubber, 1400 parts by weight of smoked sheet rubber was added to a Banbury mixer and mixed for 5 minutes at 25° C. The chemical to be tested was added to a 400 parts by weight portion of the rubber from the first step on a rubber mill at 70° C. The mixture was milled for 5 minutes, cutting several times from each side to obtain adequate dispersion. The rubber containing the test ingredient and carbon black were then added to the remainder of the stock in the Banbury after preheating the Banbury mixer to 100° C. Mixing was continued for 6 minutes and the stock dumped and passed six times through a rubber mill at 70° C. The remaining ingredients were added on the mill at 70° C. Final compositions were as follows:

| Stocks | Parts by weight | |
|---|---|---|
| | E | F |
| Smoked sheet rubber | 100 | 100 |
| Chemical promoter | | 0.5 |
| Zinc oxide | 5 | 5 |
| Stearic acid | 3 | 3 |
| Saturated hydrocarbon softener | 3 | 3 |
| N-cyclohexyl-2-benzothiazolesulfenamide | 0.5 | 0.5 |
| Sulfur | 2.5 | 2.5 |

The stocks were cured by heating in a press for 60 minutes at 144° C. and properties determined as hereinabove described. The changes from the untreated control stock C were calculated. In the results recorded below, + indicates percent increase and − indicates percent decrease.

| Chemical promoter | 300% modulus, percent change | Elongation, percent change | Torsional hysteresis, percent change |
|---|---|---|---|
| N-(p-nitrosoanilinomethyl)-phthalimide | +15.5 | −13 | −34.5 |

The promoters are especially useful for compounding blends of natural rubber and SBR copolymer rubber. Due to the poorer hysteresis properties of the synthetic as compared to the natural product, it is not feasible to make thick articles subject to severe stress, as for example large truck tires, from synthetic rubber. Excessive heat accumulates during use causing early failure. However, for reasons of economy it is common to admix natural rubber with the synthetic product but the amount of synthetic which can be used depends upon the hysteresis properties of the mixture. The practice of the present invention permits the use of higher amounts of synthetic than would otherwise be feasible. As illustrative of the advantages obtained from blends of rubbers, a mixture of 70 parts natural rubber and 30 parts styrene-butadiene copolymer rubber was employed in compounding stocks with the chemical adjuvants of this invention. The mixing procedure was the same as that described for natural rubber. The composition of the vulcanizable stocks finally prepared was as follows:

| Stocks | Parts by weight | |
|---|---|---|
| | G | H |
| Natural rubber—SBR (70/30) | 100 | 100 |
| Chemical promoter | | 0.5 |
| Zinc oxide | 4.7 | 4.7 |
| Stearic acid | 2.7 | 2.7 |
| Saturated hydrocarbon softener | 5 | 5 |
| N-cyclohexyl-2-benzothiazolesulfenamide | 0.71 | 0.71 |
| Sulfur | 2.18 | 2.18 |

Stocks were cured by heating in a press at 144° C. and properties evaluated as hereinabove described.

| Chemical promoter | 300% modulus, percent change | Elongation, percent change | Torsional hysteresis, percent change |
|---|---|---|---|
| N-(p-Nitrosoanilinomethyl)-phthalimide | +11.5 | −13.6 | −36.7 |

A mixture of equal parts by weight natural rubber and SBR copolymer rubber treated with carbon black and promoter was compared to a natural rubber control. A mixture of equal parts natural rubber and SBR copolymer rubber was blended for three minutes in a Banbury mixer at 25° C. The promoter was mixed with 700 grams of carbon black by thorough shaking in a large bottle. The carbon black and promoter mixture together with 1400 grams of the rubber mixture from the first step were added to a pre-heated Banbury mixer at 100° C. The composition was masticated for 3 minutes, the Banbury swept down and mastication continued for another 3 minutes. The composition was then transferred to a rubber mill at 70° C. and passed six times through the mill. Remaining ingredients were then added on the mill. The natural rubber control was prepared by masticating the rubber 3 minutes in a Banbury at 25° C. The masticated rubber and carbon black were then added to a pre-heated Banbury at 100° C. and mixed for 3 minutes the Banbury swept down and mixing continued for another 3 minutes. The composition was then transferred to a rubber mill at 70° C. and passed six times through the mill. Remaining ingredients were added on the mill. The final compositions were as follows:

| Stock | Parts by weight | |
|---|---|---|
| | J | K |
| Natural rubber | 100 | |
| Natural rubber—SBR (50/50) | | 100 |
| Chemical promoter | | 0.5 |
| Carbon black (HAF) | 50 | 50 |
| Zinc oxide | 5 | 5 |
| Stearic acid | 3 | 2.5 |
| Saturated hydrocarbon softener | 3 | 6.5 |
| N-cyclohexyl-2-benzothiazolesulfenamide | 0.5 | 0.85 |
| Sulfur | 2.5 | 2.13 |
| Antioxidant | 1.5 | 1.5 |

The stocks were cured by heating in a press at 144° C. for 45 minutes. The physical properties of the vulcanizates follow:

| Stock | Chemical promoter | Modulus of elasticity in lbs./in.² at 300% elongation | Ult. elong., percent | Torsional hysteresis |
|---|---|---|---|---|
| J | None | 2650 | 500 | 0.161 |
| K | N-(p-Nitrosoanilinomethyl)-phthalimide | 3030 | 390 | 0.160 |

In addition it was observed that uncured stock J scorched in 21 minutes as compared to 35 minutes for stock K. The scorch determinations were carried out at 121° C. with a Mooney plastometer. The minutes required for ten points rise above the minimum values were recorded.

While the promoters of this invention are particularly applicable to natural rubber and the butadiene-styrene copolymer rubber and mixtures thereof, they are also useful in synthetic rubbery homopolymers of aliphatic conjugated diene hydrocarbons as for example cis-polybutadiene and cis-polyisoprene as well as synthetic rubbery copolymers containing 50% or more of such diolefin hydrocarbon copolymerized with copolymerizable mono-olefins, as for example styrene, acrylonitrile and monovinylpyridine.

It is intended to cover all changes and modifications of the examples of the invention herein chosen for purposes of disclosure which do not constitute departures from the spirit and scope of the invention.

What is claimed is:

1. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, and mixtures of such rubbers, with a relatively large amount of rubber reinforcing pigment and adding to the rubber in the presence of the pigment 0.05–5.0% of the rubber of a nitrosoarylaminomethylimide characterized by the structure

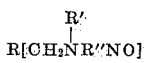

where R is an organic amino substituent, in which nitrogen is linked to the methylene group in the brackets, selected from the group consisting of:

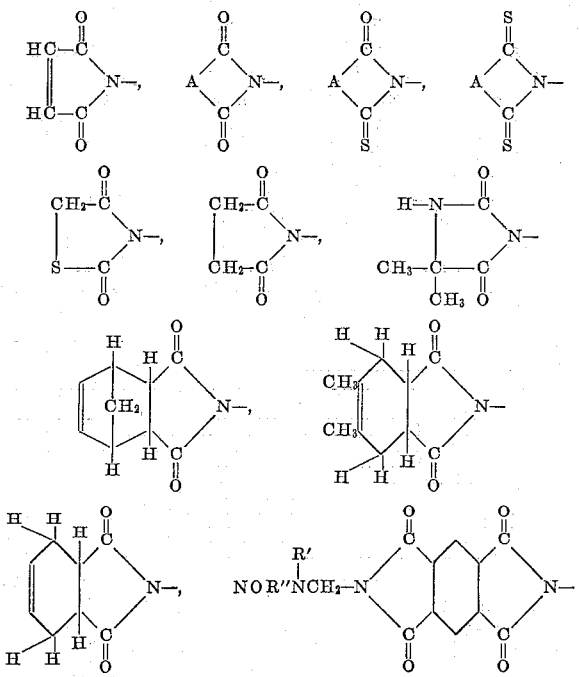

where A represents a radical selected from the group consisting of ortho-phenylene and substituted ortho-phenylene wherein the substituents are selected from the group consisting of halogen, lower alkyl, lower alkoxy and nitro, R' is selected from the group consisting of hydrogen, lower alkyl, nitroso, cyanoethyl, lower alkyl carboxyethyl and carboxyethyl groups, R" is selected from the group consisting of phenyl and substituted phenyl wherein the substituents are selected from the group consisting of halogen, lower alkyl, lower alkoxy and nitro, any vulcanizing agents, if present, being present in amounts insufficient to cause vulcanization, heating the mixture within the range of about 250° F. to 370° F. for a time sufficient to promote rubber-filler interaction and masticating the mixture.

2. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, and mixtures of such rubbers, with a relatively large amount of rubber reinforcing pigment and adding to the rubber in the presence of the pigment 0.05–5.0% of the rubber of N-(N-methyl-p-nitrosoanilinomethyl)-phthalimide, any vulcanizing agents, if present, being present in amounts insufficient to cause vulcanization, heating the mixture within the range of about 250° F. to 370° F. for a time sufficient to promote rubber-filler interaction and masticating the mixture.

3. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, and mixtures of such rubbers, with a relatively large amount of rubber reinforcing pigment and adding to the rubber in the presence of the pigment 0.05–5.0% of the rubber of N-(p-nitrosoanilinomethyl)-phthalimide, any vulcanizing agents, if present, being present in amounts insufficient to cause vulcanization, heating the mixture within the range of about 250° F. to 370° F. for a time sufficient to promote rubber-filler interaction and masticating the mixture.

4. The process of claim 1 in which the reinforcing pigment is carbon black.

5. The process of claim 2 in which the reinforcing pigment is carbon black.

6. The process of claim 3 in which the reinforcing pigment is carbon black.

7. A process which comprises mixing natural rubber, styrene-butadiene copolymer rubber, a relatively large amount of carbon black and adding to the rubber in the presence of the carbon black 0.25–1.0% of the combined rubber of N-(p-nitrosoanilinomethyl)-phthalimide, any vulcanizing agents, if present, being present in amounts insufficient to cause vulcanization, heating the mixture within the range of 250–370° F. for a time sufficient to promote rubber-carbon black interaction and masticating the mixture.

References Cited in the file of this patent

UNITED STATES PATENTS

| | | |
|---|---|---|
| 2,734,885 | Doak | Feb. 14, 1956 |
| 2,734,887 | Doak | Feb. 14, 1956 |
| 2,891,924 | Doak | June 23, 1959 |
| 2,891,925 | Doak | June 23, 1959 |
| 2,927,930 | D'Amico | Mar. 8, 1960 |

OTHER REFERENCES

Doak et al.: Canadian Journal of Tech., volume 33, 1955, pages 98–108.